2 Sheets—Sheet 1

H. D. & D. W. SWIFT,

Assignors to G. H. WHITCOMB & Co.

ENVELOPE MACHINE.

No. 9,800. Reissued July 12, 1881.

WITNESSES;

Edward K. Hill.
Edward F. Tolman.

INVENTORS

Henry D. Swift
D. Wheler Swift

H. D. & D. W. SWIFT,
Assignors to G. H. WHITCOMB & Co.
ENVELOPE MACHINE.
No. 9,800. Reissued July 12, 1881.
Fig. 4.
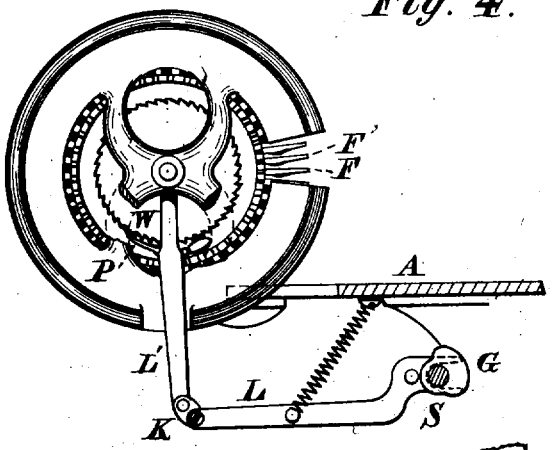
Fig. 7.
Fig. 6.
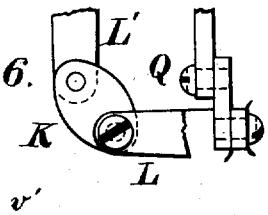
Fig. 5.
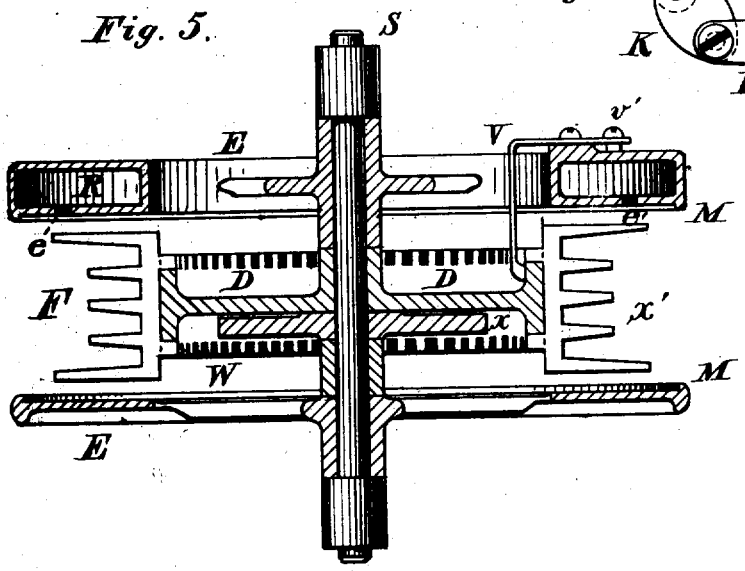
WITNESSES;
Edward H. Hill.
Edward F. Tolman.
INVENTORS;
Henry D. Swift
D. Wheeler Swift

UNITED STATES PATENT OFFICE.

HENRY D. SWIFT AND D. WHEELER SWIFT, OF WORCESTER, MASS., ASSIGNORS TO G. HENRY WHITCOMB & CO., OF SAME PLACE.

ENVELOPE-MACHINE.

SPECIFICATION forming part of Reissued Letters Patent No. 9,800, dated July 12, 1881.

Original No. 212,634, dated February 25, 1879. Application for reissue filed July 30, 1879.

*To all whom it may concern:*

Be it known that we, HENRY D. SWIFT and D. WHEELER SWIFT, of Worcester, in the county of Worcester and State of Massachusetts, have invented a certain new and useful Improvement in Envelope-Machines, which improvement is fully set forth in the following specification and accompanying drawings, in which—

Figure 1:
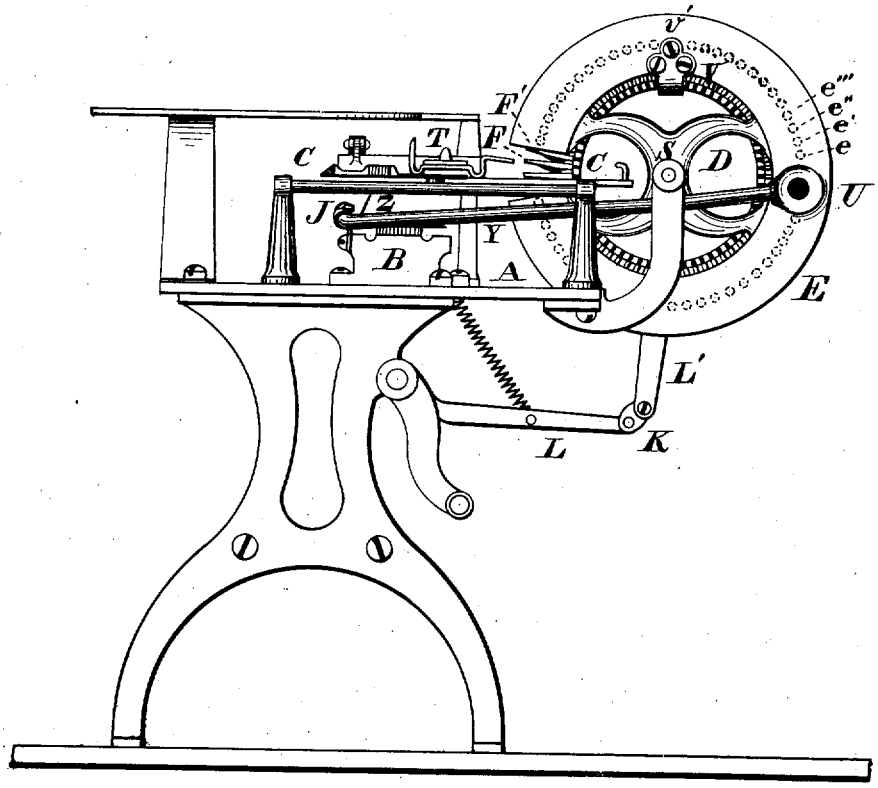
Figure 2:
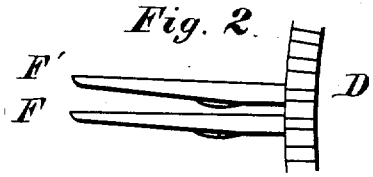
Figure 3:
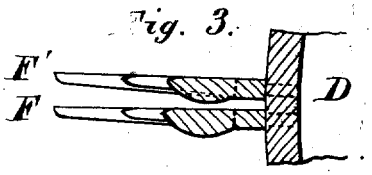

Figure 1 is an end elevation; Fig. 2, a side view of two projecting fingers; Fig. 3, a section of two projecting fingers on the line X X′, Fig. 5; Fig. 4, a side elevation of the drum, showing fingers, ratchet and pawl, &c.; Fig. 5, a horizontal section of the drum and flanges; Fig. 6, a side elevation of eccentric link; Fig. 7, an end elevation of eccentric link.

Similar letters of reference indicate corresponding parts.

This invention consists of certain improvements in the folding and drying apparatus of envelope-machines, which are described and represented as applied to the improved machines patented by us heretofore—to wit, on February 22, 1876, and on December 26, 1876—though the same may be advantageously applied to other forms of that class of envelope-machines in which gum is applied to the seal-flaps of the envelopes after they are placed in the machine.

In place of the drying-belt, as represented in our said former machines, or of a flexible belt or endless apron having pockets formed by radiating arms, we use a drum, D, which is caused to revolve with an intermittent motion upon a shaft, S. On the rim or lateral surface of this drum are rigidly fitted projecting fingers F F′, &c., at equal distances from one another, forming a series of elongated spur-gear teeth extending over the whole lateral surface of the drum. Each finger is of a length and width corresponding to the size of a folded envelope, and has two or more short projections, $x^1$ $x^2$ $x^3$, &c., so that an envelope may be held in the space between two consecutive fingers and no pressure be exerted on the recently-gummed parts while the gum on the seal-flap is drying. The fingers F F′, &c., are preferably fastened rigidly to the drum, and are made of such a shape and are set at such a distance from one another, substantially as shown in Figs. 2, 3, and 4, that a recently-folded envelope will be held between two of them by reason of the pressure of its upper and lower sides against the fingers, this pressure being due to the elasticity of the paper. In this way movable fingers are avoided, such as were used on the belt in our former machines, they having been found to be expensive and inconvenient.

The drum D, supported on its shaft S, is attached by hangers to the frame A of the machine, at such height and distance from the frame that the carrying-frame C, in its forward motion—*i. e.*, when moving toward the drum—may deliver a folded envelope, which it brings from the folding mechanism B, into a space between the fingers F F′, and in its return movement may take a dry envelope from the space above and carry it to the plate T, by which it is transferred to the curved receiver.

The device for giving a reciprocating motion to the carrying-frame C is omitted to avoid complicating the drawings. It is clearly shown in our said former patents.

An instant before the carrying-frame has reached the limit of its forward motion the drum D is caused to move in the direction of the arrow, Fig. 1, the distance of a space between two fingers, so that the envelope brought from the folding mechanism B and placed between two of the fingers is carried one space toward the under side of the drum, and a dried envelope is at the same time brought into position to be pushed on the plate T by the return movement of the carrying-frame. This intermittent motion of the drum is secured by the cam G, Fig. 4, on the driving-shaft, acting through levers L L′, and the pawl P upon the ratchet-wheel W.

For the successful operation of the drum, in connection with the carrying-frame, it is necessary that the fingers should be exactly in position to receive the envelopes from the carrying-frame. It is therefore desirable to adjust the relative position of the fingers and the carrying-frame. This is accomplished by means of the eccentric-link K. If the screw Q, Figs. 6 and 7, be loosened and the link moved slightly in either direction, the position of the pawl P with reference to that of the cam G will be altered, and consequently the relative position of the drum and the carrying-frame.

Covering the ends of the drum, and, if desired, with lips M M′ projecting slightly over the ends of the fingers, are the guard-flanges E E′. These assist in retaining the envelopes in the spaces between the fingers, except at the opening O, which is cut out to allow the carrying-frame C access to the fingers. One of the flanges, E, is made thick enough to contain a circular chamber, R, into which air is forced by an ordinary blowing apparatus through the pipe U, and from which, through a series of holes, *e e′*, &c., jets of air are directed across the envelopes, under the seal-flaps of the same, as they are successively brought opposite the holes by the drum in its revolution.

To prevent any motion of the drum, except when acted upon by the pawl, a brake, V, is used. It is fastened to the guard-flange E by screws $v' v^2 v^3$, of which $v^2 v^3$, while they fasten the arm V to the flange E, serve also as a fulcrum. The bearing-surface is upon the under side of the rim of the drum, and the degree of pressure is regulated by turning the screw $v'$.

Having thus described our invention, we claim as new and desire to secure by Letters Patent—

1. In an envelope-machine, a revolving drum having fingers projecting from its rim, the interval between adjacent fingers being slightly greater than the thickness of the folded envelope to be held, whereby folded envelopes may be held between adjacent fingers by pressure resulting from contact of the sides of the envelopes with the fingers, substantially as shown and set forth.

2. The fingers F F′, &c., rigidly fixed on the lateral surface of a drum, made of such form and placed at such a distance from one another that folded and gummed envelopes will be held between them by the elasticity of the paper, substantially as shown and described.

3. The combination of the revolving drum D, having fixed projecting fingers F F′, &c., the air-chamber R, with holes *e e′*, &c., to direct a blast across the envelopes from end to end, the pawl P and ratchet-wheel W, operated by the cam G and levers L L′, all forming a drying apparatus for envelope-machines, substantially as shown and described.

4. The eccentric-link K, in combination with the levers L L′, and the pawl P and ratchet-wheel W, and the drum having fixed projecting fingers for adjusting the relative position of the drum-fingers F F′, &c., and the carrying-frame C, substantially as shown and described.

5. The brake V, attached to a projection on the flange E by screws $v^2 v^3$, and regulated by the screw $v'$, in combination with the drum D, having fixed projecting fingers, substantially as shown and described.

HENRY D. SWIFT.
D. WHEELER SWIFT.

Witnesses:
JAMES LOGAN,
S. A. ESTABROOK.